Figure 1:
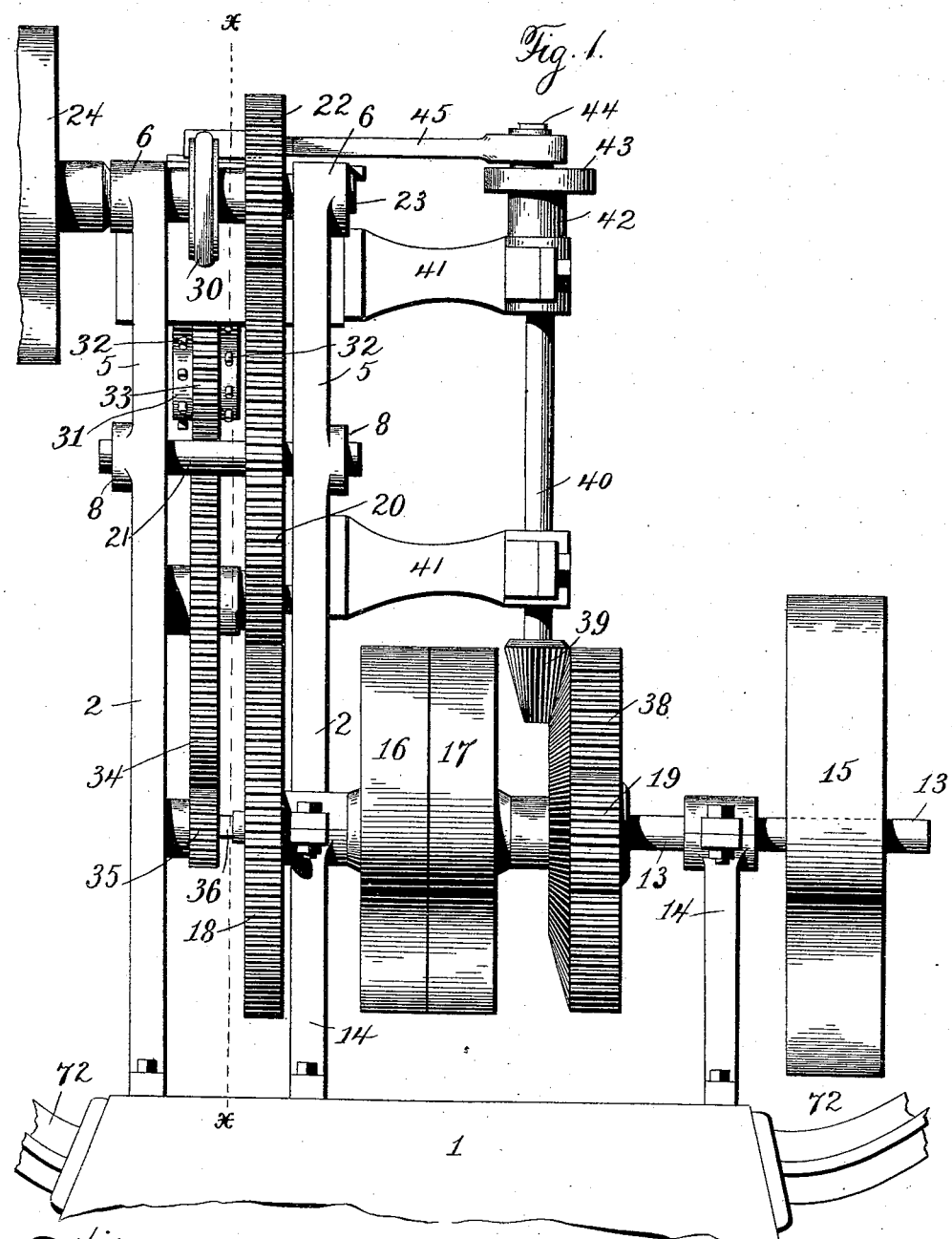

(No Model.) 7 Sheets—Sheet 2.
E. F. HATHAWAY.
MACHINE FOR MAKING WIRE FENCE STRANDS.
No. 471,669. Patented Mar. 29, 1892.

(No Model.)  7 Sheets—Sheet 3.

E. F. HATHAWAY.
MACHINE FOR MAKING WIRE FENCE STRANDS.

No. 471,669.  Patented Mar. 29, 1892.

(No Model.) 7 Sheets—Sheet 4.
E. F. HATHAWAY.
MACHINE FOR MAKING WIRE FENCE STRANDS.

No. 471,669. Patented Mar. 29, 1892.

Witnesses:
Jas. E. Hutchinson
J. A. Rutherford

Inventor:
Edgar F. Hathaway,
By James L. Norris.
Attorney.

(No Model.) 7 Sheets—Sheet 5.
E. F. HATHAWAY.
MACHINE FOR MAKING WIRE FENCE STRANDS.
No. 471,669. Patented Mar. 29, 1892.
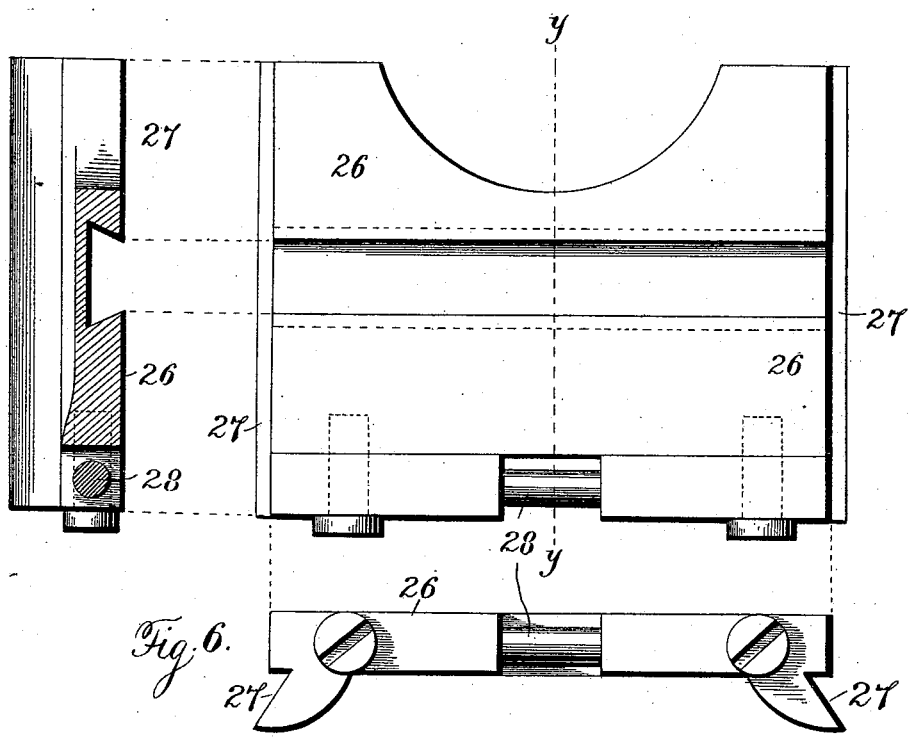
Witnesses:
Jas. E. Hutchinson
J. A. Rutherford
Inventor.
Edgar F. Hathaway,
By James L. Norris.
Attorney.

(No Model.) 7 Sheets—Sheet 6.

E. F. HATHAWAY.
MACHINE FOR MAKING WIRE FENCE STRANDS.

No. 471,669. Patented Mar. 29, 1892.

Witnesses:
Jas. E. Hutchinson
J. A. Rutherford

Inventor.
Edgar F. Hathaway,
By James L. Norris
Attorney (No Model.) 7 Sheets—Sheet 7.
E. F. HATHAWAY.
MACHINE FOR MAKING WIRE FENCE STRANDS.
No. 471,669. Patented Mar. 29, 1892.
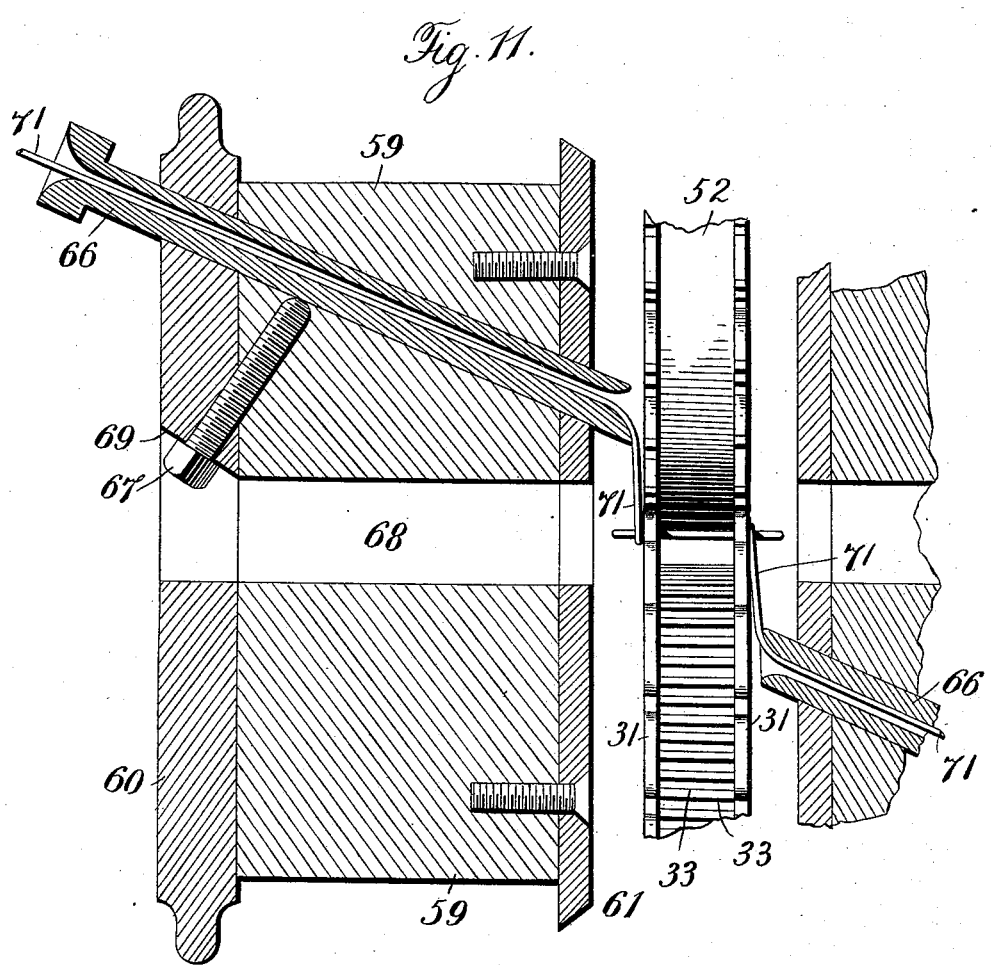

UNITED STATES PATENT OFFICE.

EDGAR F. HATHAWAY, OF HORNELLSVILLE, NEW YORK.

MACHINE FOR MAKING WIRE FENCE-STRANDS.

SPECIFICATION forming part of Letters Patent No. 471,669, dated March 29, 1892.

Application filed May 9, 1891. Serial No. 392,213. (No model.)

*To all whom it may concern:*

Be it known that I, EDGAR F. HATHAWAY, a citizen of the United States, residing at Hornellsville, in the county of Steuben and State of New York, have invented new and useful Improvements in Machines for Manufacturing Wire Fence-Strands, of which the following is a specification.

My invention relates to certain new and useful improvements in automatic mechanism for forming wire strands for fencing and other purposes.

It is the object of my invention to provide a machine capable of automatic action, whereby a wire strand may be rapidly produced composed of two longitudinal wires and a filling-wire laid between, the bights or loops of said wire projecting alternately beyond or outside the longitudinal wires, which wind around and compress the loops.

It is my purpose, also, to provide an automatic mechanism whereby two longitudinal and substantially parallel side wires shall be wound in one or more coils around the projecting parts of filling-pieces interposed between the side wires and having parts extending or projecting slightly beyond the same.

My invention comprises a mechanism having a head to which a double or compound reciprocation is imparted to enable a guide carried thereby to lay a continuous wire upon pins or retaining devices arranged upon a support having continuous movement, a stripper removing the formed wire from said support, a gripper by which the parts of the filling engaged by the side wires are successively grasped and held, and side winders having guides which carry the longitudinal wires around the said portions of the filling as they are held by the gripper.

The invention also comprises novel features of construction and new mechanical combinations, all of which will be fully and specifically described hereinafter, and then particularly pointed out and defined in the claims following this specification.

To enable others skilled in the art to which my invention pertains to make, construct, and use the same, I will proceed to describe said invention in detail, reference being had to the accompanying drawings, in which—

Figure 2:
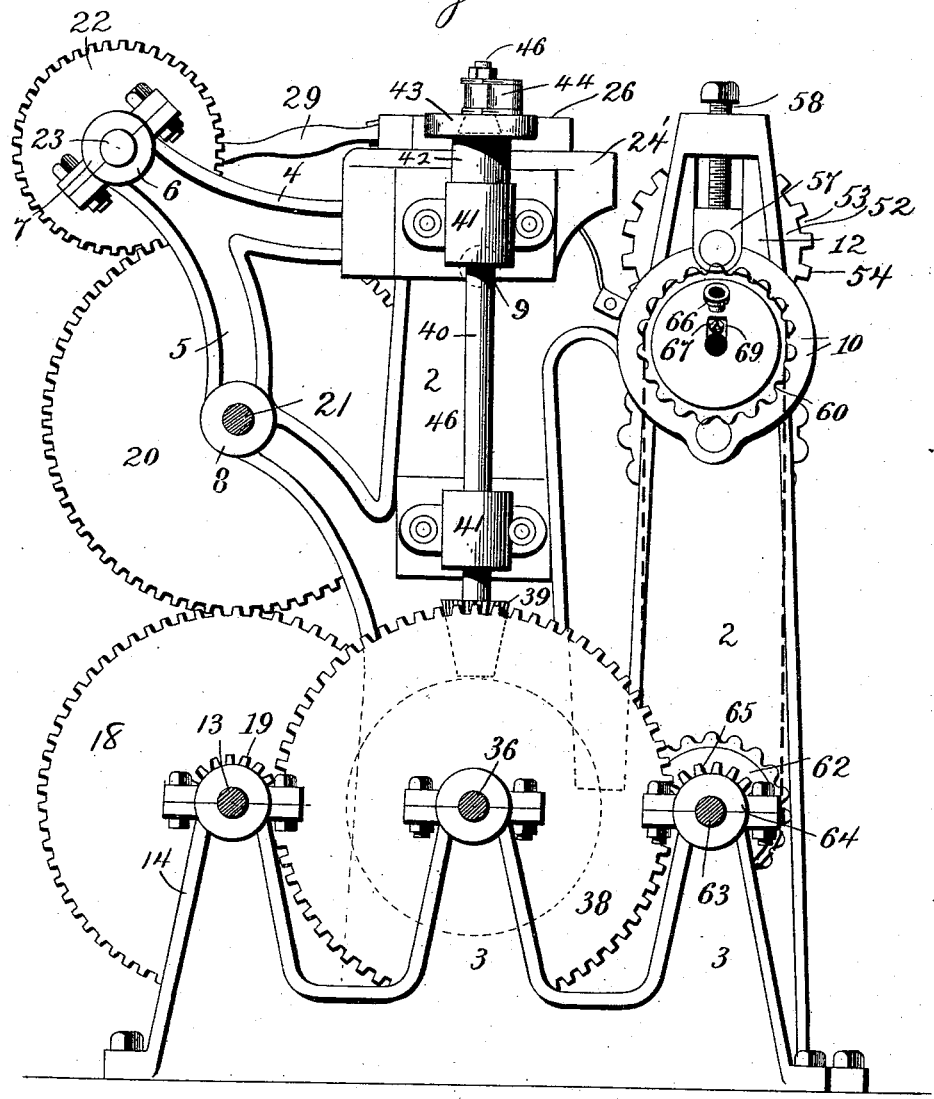
Figure 3:
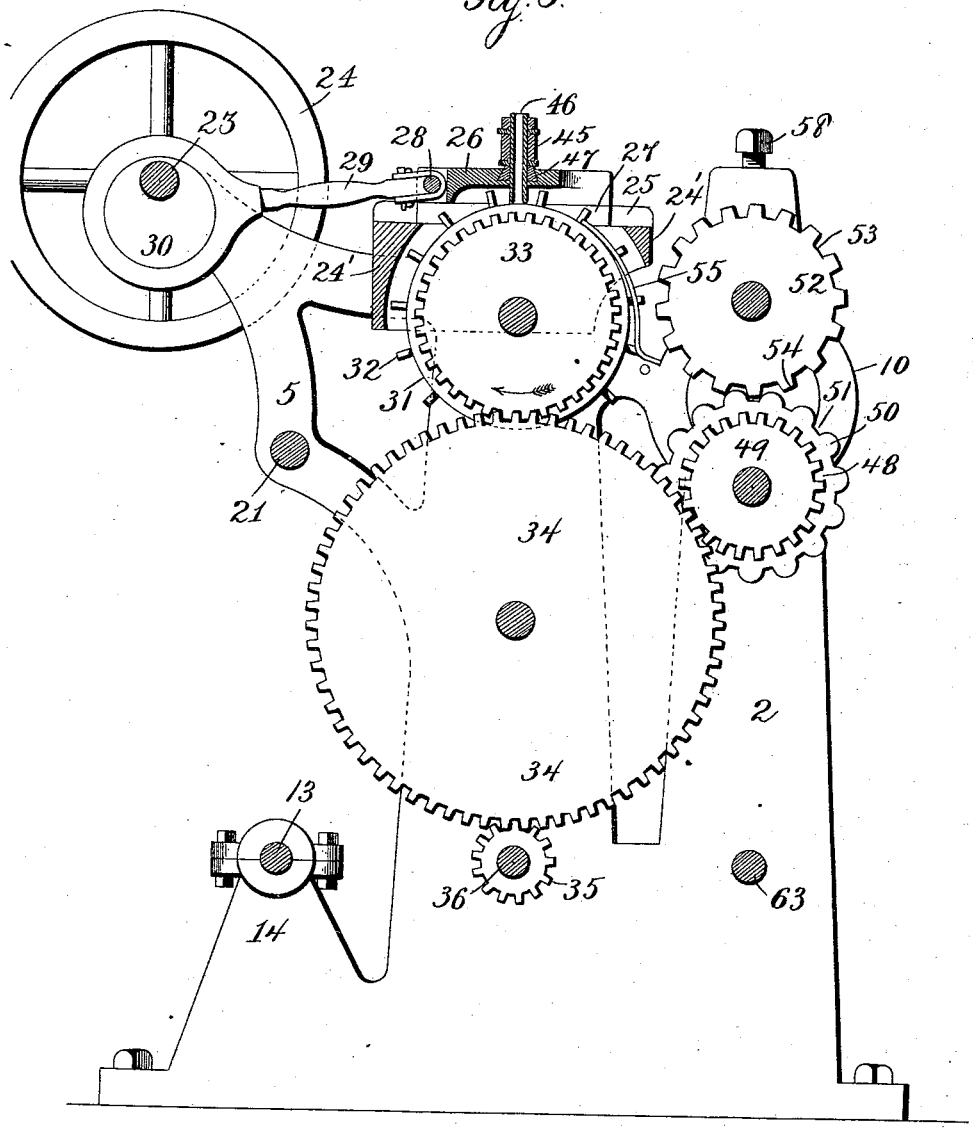
Figure 4:
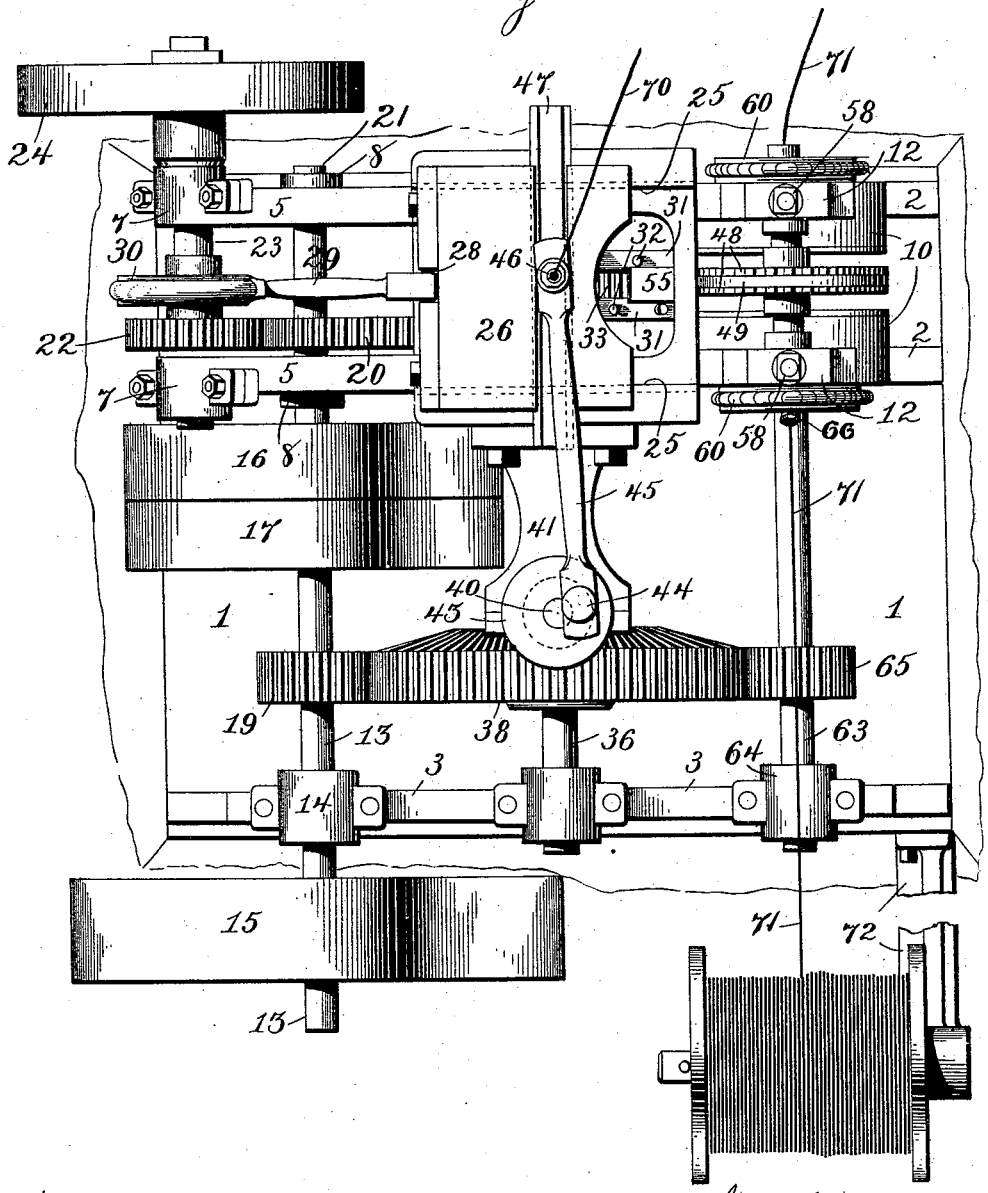
Figure 8:
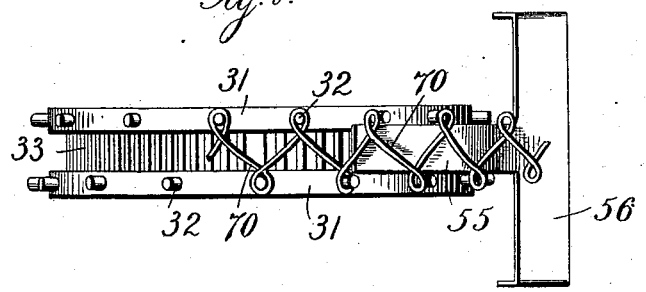
Figure 10:
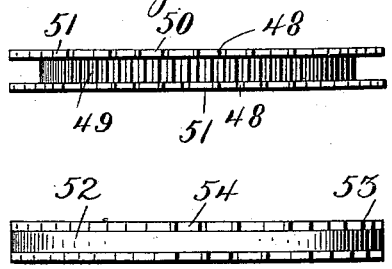
Figure 9:
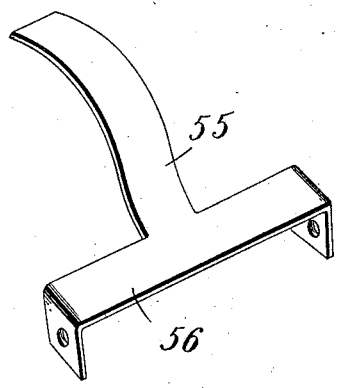
Figure 12:
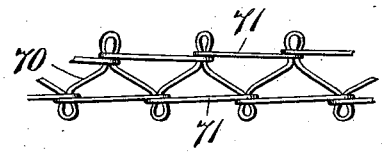
Figure 13:
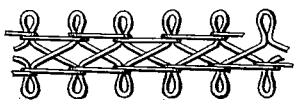
Figure 14:
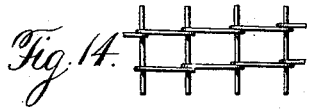

Figure 1 is a front elevation of a machine embodying my invention. Fig. 2 is a side elevation of the mechanism shown in Fig. 1. Fig. 3 is a sectional elevation of the parts shown in Fig. 2, the section being taken vertically in the line $x\ x$, Fig. 1. Fig. 4 is a plan view of the machine. Fig. 5 is a detail plan view of the reciprocating slide upon which or within which reciprocates the bar carrying the head through which the filling-wire passes. Fig. 6 is an end elevation of the reciprocating slide shown in Fig. 5. Fig. 7 is a section of Fig. 5 upon the line $y\ y$. Fig. 8 is a detail plan view of the pin-support upon which the filling-wire is laid and the stripper removing the same. Fig. 9 is a detail perspective of the stripper shown in Fig. 8. Fig. 10 is a detail plan view of the members of the gripper by which the filling is held as the side winders connect the longitudinal wires therewith. Fig. 11 is a detail vertical section of one of the side winders and part of the other. Fig. 12 is a view of a portion of the finished strand. Figs. 13 and 14 are views showing modified forms of strand.

In the said drawings the reference-numeral 1 indicates the bed-plate or base of the machine, from which rise two uprights or standards 2, separated by a comparatively narrow space or interval, each upright being substantially of the form hereinafter described. These uprights are usually arranged upon one side of the central line of the bed-plate, and, in connection with a separate upright 3, they form the supports for all the active elements of the mechanism. Each of the uprights 2 consists of a strong metallic plate having a foot, which is bolted or otherwise secured to the base. To lighten the construction and economize material, it is usually formed with a vertical opening dividing the upright for a portion of its length into two parts or sections. From the edge of the section nearest the front end of the machine projects a bracket consisting of an arm 4, extending from the top of the said section, its end being united with a supporting-arm 5, which rises from the edge of the upright some distance below. These arms are preferably cast in one piece with the upright. At the extremity of the arm 4, which is widened by its union with the arm 5, is formed a pillow-bearing 6, having lugs which serve for the attachment of a cap 7. In the supporting-arm 5, between its ends, is formed a circular bearing 8, for a purpose presently to be shown, and in the middle portion of the front section of the upright, near the top of the same, is formed a circular bearing 9, and the top of this section is connected by a web of metal with a large ring cast upon the other section and forming a bearing 10. An extension 12 is cast upon the top of the ring. The other bearings will be described in their order in connection with the parts mounted therein.

The numeral 13 indicates the power-shaft of the machine, one end of which lies in a pillow-bearing upon a foot-bracket 14, extending from the front edge of one of the uprights, its other end lying in a similar bearing upon the upright 3, beyond which the shaft extends to receive a belt-pulley 15. Upon the shaft is mounted a fast and a loose pulley 16 and 17, belted to any suitable source of power. Upon the end of this power-shaft, which projects beyond the foot-bracket in which it lies, is mounted a gear 18, lying between the uprights 2, and between the pulleys and the upright 3 is mounted a small gear 19. From the gear 18 motion is communicated to an intermeshing gear 20, mounted upon a short shaft 21, which has support in the bearings 8 in the arms 5. This gear 20 is simply an intermediate, by which motion is given to a gear 22, carried by a shaft 23, resting in the pillow-bearings 6 at the end of the arms 5. One end of this shaft projects beyond the outer upright to receive a fly-wheel 24.

Upon the upper ends of the rearward sections of the uprights 2 is mounted a rectangular frame 24', lying between said uprights and provided with ways 25, upon which reciprocates a sliding block or table 26, having dovetails 27, which underlie the undercut ways 25. The block or table 26 is provided with a bearing 28, upon which is mounted the head of a pitman 29, which is actuated by a ring-eccentric 30 upon the shaft 23, whereby the block or table is driven back and forth upon its ways between the uprights 2.

The rectangular frame 24' is cut away at both ends to form concentric channels or recesses, within which lies a double or two-part disk 31, which may be termed the "pin-wheel," since upon its periphery are arranged two series of short pins 32, projecting radially from the face near the edges, the pins of one series being arranged to alternate with those of the other. The construction of the pin-wheel shown in the drawings is indicated above, as it consists, practically, of two similar disks having the two alternating series of pins on their peripheries separated by an intermediate gear 33, preferably of somewhat less diameter, so that the points of the gear-teeth will not project. The shaft of this pin-wheel is supported in the bearings 9 at or near the top of the front sections of the uprights, and the pin-wheel is driven by a gear 34 of such width or thickness that its teeth may enter between the disks 31 and mesh with the intermediate gear 33. The gear 34 is driven by a small gear 35, carried by a shaft 36, which at one end is supported by a pillow-bearing in the upright 3, its other end passing through the lower portion of the upright 2 to receive the small gear 35. The shaft 36 in turn is driven by a small gear 19 on the power-shaft 13, which meshes with a large gear 38 on the shaft 36. This large gear is cut upon the face to mesh with the driving-pinion 19, and is also cut upon the bevel to mesh with a small bevel or miter gear 39, mounted on the lower end of a vertical shaft 40, which has bearing in bracket-arms 41, bolted to the outer face of one of the uprights 2. At its upper end this vertical shaft is provided with a head 42, resting on the upper bracket-arm 41 and having a disk 43, upon the upper face of which is formed or mounted a wrist 44, which has engagement with the head of a pitman 45. At its end this pitman engages pivotally with a top guide 46, consisting, substantially, of a hollow or tubular device mounted or forming part of a slide-bar 47, fitting in a dovetailed recess cut in the block or table 26 in a line at right angles with the line of reciprocation, as shown in the plan view, Fig. 5. The top guide 46 passes downward through a transverse slot in the reciprocating table 26 and its lower end drops to a point almost flush with the peripheries of the two disks 31. Its upper end rises above the pivotal bearing with which the pitman 45 engages. These parts—that is, the mechanism driving the reciprocating block or table 26, the reciprocating slide-bar 47, carrying the tubular top guide, and the gearing imparting motion to the pin-wheel 31—have such movement and are so timed with relation to each other that the lower end of the tubular top guide will describe a figure 8 immediately over the pin-wheel, said guide passing in rear of one of the pins 32, then traveling in the same direction with, but faster than, the pin-wheel until it passes the pin behind which the wire has been laid, and moves in front of the same, thereby laying a loop or bight around said pin. The guide now crosses to the alternating pin in the other series and lays a similar loop thereon, the pin-wheel being in continuous uniform motion throughout the operation.

Immediately in rear of the pin-wheel and in the same vertical plane with its intermediate gear 33 are arranged the gripping devices. These consist of an upper and a lower member, the latter being constructed of two similar metallic plates 48 of circular form bolted or otherwise attached to the opposite flat faces of an intermediate toothed disk or gear 49 of less diameter. The projecting edges of these plates are provided with rounded serrations 50, having the pockets or spaces 51 between the same of such width as to receive the intersecting portions of the bights of the wire laid upon the pin-wheel, the interval between said pockets upon the same side or in the same plate 48 being equal to the distance separating the pins upon one of the disks of the pin-wheel. The two plates 48 are so arranged that these pockets or spaces will present the same alternation as the pins in order that the filling-wire as it comes from the pin-wheel may pass naturally into the said spaces. The upper member of the gripper consists of a central circular plate 52 of such thickness that its edge may turn freely in the space between the plates 48 of the lower member. Upon the opposite faces of the circular plate are mounted metallic plates 53, having a thickness substantially equal to that of the plates 48 and provided upon their edges with points 54, having a form approximating that of the teeth of a large gear, the intervals being such that the ends of said points will enter the successive pockets or spaces 51. The points 54 have the same alternating arrangement already described in connection with the arrangement of the pockets, and the rotation of the upper member of the gripper is produced by the mesh of its points with the rounded serrations 50 of the lower member. The latter is driven by the large gear 34, which enters between the face-plates 48 to mesh with the teeth of the intermediate gear 49.

The looped wire is removed from the pin-wheel by a stripper 55, consisting of a metallic strip or plate mounted upon or forming part of a cross-head 56, which is bolted to the inner faces of the uprights 2 between the pin-wheel and the gripper. The stripper is curved from its point of support to constantly approach the peripheries of the disks 31, upon which its end portion rests between the pins 32. As the pin-wheel moves the wire looped upon its pins will ride over the outer curved face of the stripper and will be gradually withdrawn from the pins, as shown in Figs. 3 and 8. The lower member of the gripper is carried by a shaft the ends of which are supported in bearings formed in the inner faces of the lowest portions of the rings which form the bearings 10, while the upper member is carried by a shaft the journals of which lie in movable boxes 57, arranged in slotted ways in the extensions 12, which rise above the ring-bearings 10. A set-screw 58, tapped through the top of each extension and having its end resting upon or swiveled in the journal-box below, affords a means of adjustment whereby the grasp of the gripping devices may be varied within any desired limit.

Within the ring-bearings 10 of the uprights 2 are mounted the side winders, each consisting of a thick circular disk 59, which enters the ring, being secured therein by means of a sprocket-wheel 60 upon its outer face, and a face-plate 61, screwed or bolted to its inner face, both being of somewhat greater diameter than the disk, whereby lateral displacement of the same is avoided, its unobstructed rotary movement permitted, and a broad and a strong base of support given to these parts. The sprockets 60 are geared with sprockets 62 upon a shaft 63, one end of which rests in a pillow-bearing 64 on the upright 3, its outer end passing through both uprights 2 and having a bearing in each. This shaft is provided with a pinion 65, meshing with the gear 38 on the counter-shaft 36. In each side winder is inserted a tubular guide 66, its entrance and exit openings being flared or funnel-shaped to remove all angles and sharp edges and permit the wire to pass freely without being cut or scraped. These guides are preferably arranged at an angle with the axis of rotation, the projecting exit end being brought close to the exterior face of the lower member of the gripper and lying so near the axis of the side winder that it describes when in motion a circle of small diameter around the successive points of engagement of the upper and lower members of said grippers. These guides are usually detachable, being fastened when in place by means of set-bolts 67, tapped into the disk 59 from the exterior. A simple and convenient construction for this purpose is to form a central or axial opening 68, which is provided with a bevel or outward flare 69, against which the head of the bolt lies. The top wire 70, forming the filling of the strand shown in Fig. 12, is taken from a spool mounted upon any convenient support, and is preferably led over a guide-roll suspended above the machine, in order that it may pass as nearly in a vertical line as possible through the top guide 46. The side wires 71, or, as they are frequently termed, the "longitudinal" wires, are preferably taken from spools supported upon spindles which are mounted on lateral brackets 72, cast upon or bolted to the sides of the bed-plate 1. (Shown in Fig. 1.) A portion of these brackets only appear in said figure, but each consists of an arm ribbed to give the required strength and lightness and curved upward from the base upon opposite sides, their spindle-bearing ends rising to a suitable height with reference to the side winders to enable the wire to pass from the spools to the tubular guides 66.

I have shown in Fig. 12 a single filling-wire only; but it should be understood that I may form the filling of two independent wires, one of which intersects the other in the central line of the strand, as shown in Fig. 13. To effect this result, it will only be necessary to add a pin in each disk 31 opposite each pin in the other disk and duplicate the top guide, one being placed at the proper interval behind or in advance of the other. The side winding mechanisms would require the substitution for those shown of others of exactly similar construction, the exit ends of the tubular guides being arranged at a proper distance from the axis of rotation. By notching or slotting the edges of the disks 31 in place of using the pins 32 straight bars may be placed therein and the said wires wound upon their projecting ends forming a strand or structure having the general form of a ladder, and the ornamental form or design of the strand may be considerably varied without departing from my invention.

What I claim is—

1. The combination, with an advancing support adapted to receive a filling, of a gripper to which the filling passes from said support and side winders arranged upon each side of the gripper to carry the side wires around the projecting portions of the filling, substantially as described.

2. The combination, with an advancing support having devices for receiving and retaining a filling, of a gripper to which said filling is delivered, and side winders having guides for the longitudinal or side wires, said guides having their exit ends arranged to revolve about the point of successive engagement of the gripper with the filling to wind the side wires about the projecting parts of said filling, substantially as described.

3. The combination, with a support having means for holding alternate loops or bights of a filling and with means for imparting movement thereto, of a block or table, a slide mounted thereon, said block having reciprocation in one direction and the slide being reciprocated at right angles to the line of movement of the block, and a guide carried by said slide and having a double or compound reciprocation partaking of the movement of both block and slide to lay a filling-wire upon opposite alternate points of said support, substantially as described.

4. The combination, with a suitable support having a double series of opposite alternating pins, of means for imparting movement in one direction thereto, a block or table having reciprocation parallel with the plane of movement, and a guide mounted upon a slide-bar carried by said table and having reciprocation in a direction transverse to said plane of movement, substantially as described.

5. The combination, with a support consisting of two similar disks mounted upon an intermediate gear of less diameter and having pins alternately projecting from their peripheries, of a block or table having reciprocation in the plane of rotation of said support and a slide-bar carried by said block and provided with a tubular guide arranged above the disks, with its lower end closely approaching their peripheries, said slide-bar having a reciprocation transverse to the plane of rotation, substantially as described.

6. The combination, with a gripping device consisting of two members, one being provided with seats or pockets and the other with points adapted to enter said seats, of means for giving movement thereto and side winders arranged upon the opposite sides of said gripping device and having tubular guides, the exit ends of which closely approach said gripper and revolve in circles of small diameter about the point of engagement of the two members, substantially as described.

7. The combination, with a gripping device consisting of an upper and a lower member, the latter composed of disks mounted upon an intermediate gear and having in their projecting edges seats or pockets separated by rounded serrations and the former composed of a disk having its edge fitting between said disks and provided upon its opposite faces with plates having points which successively enter the seats or pockets, of gearing imparting movement to the lower member and side winders having tubular guides inclined to the axis of revolution, their exit ends closely approaching the opposite faces of the gripper and revolving around the line of successive engagement of the points and seats, substantially as described.

8. The combination, with a support consisting of two disks mounted upon an intermediate gear and having on their projecting peripheries pins arranged at suitable intervals, of a top guide having a double or compound reciprocation parallel with and transverse to the plane of rotation, a stripping-plate having its end resting on the disks between the pins, a gripper having seats or pockets in one member and points upon another adapted to successively engage said seats, and side winders having tubular guides upon both sides of the gripper, the exit ends of said guides having revolution around a line drawn transversely through the point of engagement of the two members of the gripper, substantially as described.

9. The combination, with a double series of radially-projecting pins mounted on a rotating support, of a guide arranged near said support and adapted to permit the passage of the filling-wire, the exit end of said guide being extended to lie and move inside the extremities of the said pins or between their ends and the support carrying said pins, means for reciprocating said guide in a line parallel with the plane of revolution, and devices for imparting thereto a contemporaneous reciprocation at or about at a right angle to said plane, substantially as described.

10. The combination, with a gripper having devices for successively engaging a filling, the latter having portions which project beyond the said gripper on each side thereof, of side winders having guides for wire arranged to revolve around the projecting portions of the filling, substantially as described.

11. The combination, with a suitable gripping or holding device adapted to engage with a filling portions of which project upon both sides of the gripper, of side winders having guides carrying the side wires, the exit or delivery ends thereof being brought close to the gripper and arranged to revolve around the portions of the filling projecting from the gripper, substantially as described.

12. The combination, with a series of pins arranged upon a support at uniform intervals and alternating with a similar series arranged parallel therewith and at a suitable distance therefrom, of means for imparting a continuous movement to said support, a guide for the filling-wire, means for reciprocating said guide in one direction parallel with the line of movement of the pins, a support in which said guide reciprocates, and means for imparting a simultaneous reciprocation to said support transverse to the line of reciprocation of the guide, the parts named being so timed that the guide is carried behind and then in front of a pin in one series and thence behind and then in front of a pin in the other and alternating series of pins, substantially as described.

In testimony whereof I have hereunto set my hand and affixed my seal in presence of two subscribing witnesses.

EDGAR F. HATHAWAY. [L. S.]

Witnesses:
DANL. L. BENTON,
WILLIAM E. HATHAWAY.